United States Patent [19]

Zechnall et al.

[11] 3,745,768

[45] July 17, 1973

[54] APPARATUS TO CONTROL THE PROPORTION OF AIR AND FUEL IN THE AIR-FUEL MIXTURE OF INTERNAL COMBUSTION ENGINES

[75] Inventors: Richard Zechnall, Stuttgart; Peter Schmidt, Schwieberdingen; Josef Wahl, Stuttgart, all of Germany

[73] Assignee: Robert Bosch GmbH, Gerlingen-Schillerhohe, Germany

[22] Filed: Mar. 30, 1972

[21] Appl. No.: 239,740

[30] Foreign Application Priority Data
Apr. 2, 1971  Germany.................. P 21 16 097.4

[52] U.S. Cl................. 60/276, 60/285, 123/119 R, 123/32 EA, 123/140 MC
[51] Int. Cl............................................ F02b 75/10
[58] Field of Search ................... 123/32 EA, 119 D, 123/140 MC; 60/273, 301

[56] References Cited
UNITED STATES PATENTS

| | | | |
|---|---|---|---|
| 3,616,274 | 10/1971 | Eddy...................................... | 60/276 |
| 3,483,851 | 12/1969 | Reichardt....................... | 123/32 EA |
| 3,370,914 | 2/1968 | Gross et al............................ | 60/301 |
| 2,244,669 | 6/1941 | Becker......................... | 123/140 MC |

Primary Examiner—Laurence M. Goodridge
Attorney—Flynn & Frishauf

[57] ABSTRACT

An oxygen analyzer responsive to oxygen partial pressure and comprising an oxygen ion conductive solid electrolyte is exposed to the exhaust gases of an internal combustion engine. The sensed value is applied to a low pass filter which is interconnected in an electrical circuit to control the amount of fuel being admitted, relative to the amount of air, so that the air-fuel ratio of the air-fuel mixture can be maintained at a predetermined level. In one embodiment, the mixture is regulated to provide a minimum of unburnt hydrocarbon and carbon monoxide in the exhaust, the remaining noxious exhaust gases formed primarily of nitrogen compounds being neutralized by a catalytic converter, so that the catalytic converter need have only single bed neutralizing only one substantial noxious exhaust component. Control of the amount of fuel can be obtained either by controlling the amount of fuel injected in an injection system, or controlling an additional air path. Sensing of other parameters, such as CO, temperature, and the like, may also be provided.

27 Claims, 10 Drawing Figures

APPARATUS TO CONTROL THE PROPORTION OF AIR AND FUEL IN THE AIR-FUEL MIXTURE OF INTERNAL COMBUSTION ENGINES

CROSS REFERENCE TO RELATED PATENTS

| | | |
|---|---|---|
| 3,448,728 | Scholl | June 10, 1969 |
| 3,463,130 | Reichardt | Aug. 26, 1969 |
| 3,470,854 | Eisele | Oct. 7, 1969 |
| 3,430,616 | Glockler | Mar. 4, 1969 |
| 3,452,727 | Hoelle | July 7, 1969 |
| 3,490,424 | Hoelle | Jan. 20, 1970 |
| 3,533,381 | Schmid | Oct. 10, 1970 |
| 3,483,851 | Reichardt | Dec. 16, 1969 |

The present invention relates to apparatus to control the ratio of air to fuel of the air-fuel mixture which is applied to an internal combustion engine. The air number lambda ($\lambda$) is a measure of the composition of the air-fuel mixture. This number $\lambda$ is proportional to the mass of air and fuel. The value of $\lambda = 1.0$ if a stoichiometric mixture is present. Under stoichiometric conditions, the mixture has such a composition that, in view of the chemical reactions, all hydrocarbons in the fuel can theoretically combine with the oxygen in the air to provide complete combustion, that is, complete combustion to carbon dioxide and water. In actual practice, even with a stoichiometric mixture, unburnt, non-combusted hydrocarbons and carbon monoxide is contained in the exhaust gases.

It has previously been proposed to test the exhaust gases passing through the exhaust pipe, or into the muffler of an internal combustion engine, and to control the carburation, or air-fuel mixture ($\lambda$) in accordance with the sensed composition of the exhaust gases. Such testing has been done, for example, by sensing the carbon monoxide (CO) partial pressure. The fuel supply to the carburetor, or to an electronic fuel injection system is then controlled in dependence on the CO content of the exhaust.

It has been found that measuring the CO content has some disadvantages in that fuel ratios in which $\lambda$ is greater than 1 cause only minor changes in CO content of the exhaust. To set the $\lambda$ for a lean mixture which is desired for certain operating conditions of an internal combustion engine, testing for CO is thus not suitable.

It has been found that it is unfortunately not possible to provide a $\lambda$ in which all noxious components of the exhaust gases simultaneously have a minimum value. The exhaust usually contains unburnt, that is, non-oxidized hydrocarbons, carbon monoxide, and nitrogen-oxygen compounds, particularly nitrous oxide. Two principal possibilities to reduce noxious exhaust emissions thus suggest themselves: The $\lambda$ can be so controlled that it is close to 1, at which number the CO content, as well as the content of non-combusted hydrocarbons is a minimum. Unfortunately, this results in a maximum of nitrogen-oxygen compounds. It is thus necessary to provide a reactor with a catalyst in the exhaust system of the internal combustion engine, in order to decompose or to fix the nitrogen-oxygen compounds. Another possibility is to use a rather rich mixture, that is, a $\lambda$ of about 0.8 to 0.9, or, alternatively, a very lean mixture (a $\lambda$ of about 1.4). In either of the last possibilities, it is necessary to include a thermal reactor in the exhaust system so that the non-combusted hydrocarbons and carbon monoxide can be additionally burnt. In any event, it is necessary to provide an exhaust reactor. The catalytic reactor to convert the nitrogen-oxygen compounds has the advantage that the exhaust emissions, as a whole, are less poisonous than those to be neutralized in the thermal reactor. On the other hand, the costs of a catalytic reactor are higher and the catalytic reactor requires more maintenance. The thermal reactor has the advantage of inexpensive construction but it does not permit effective cleaning of the exhaust gases to remove noxious components.

It is an object of the present invention to provide an apparatus to sense and test the exhaust emissions from an internal combustion engine, combined with an associated electronic control system which permits control of the fuel-air mixture, that is, the $\lambda$ of the mixture in a wide range of from $\lambda = 0.7$ to $\lambda = 1.4$, and to combine the system with an internal combustion engine in such a manner that noxious exhaust is substantially minimized or eliminated.

Subject matter of the present invention: Briefly, an exhaust sensing device is placed in sensing relationship with the exhaust gases, for example by locating it in the exhaust manifold, exhaust pipe or in the muffler, the sensing device being sensitive to oxygen partial pressure in the exhaust. The sensing device includes an oxygen ion conductive solid electrolyte. An electronic control system which includes a low pass filter is inserted between the oxygen partial pressure sensor and the fuel control element. Such an oxygen sensing device having a solid electrolyte, preferably made of zirconium oxide has been previously proposed. These sensing elements have a response time which is very short — a few milliseconds — so that the output signal thereof changes rapidly during transient operating conditions of the engine, for example during starting. The variations of the output signals due to the non-uniformity of the exhaust gases are filtered electronically by the low pass filter, so that only the average partial oxygen pressure is applied to the control circuit.

The control apparatus in accordance with the present invention can be utilized both with a fuel injection system, as well as with a carburetor-supplied internal combustion engine. The internal combustion engine may be of the piston type, or of any other one, for example of the rotary type. To control fuel injection internal combustion engines, the low pass filter preferably has a threshold circuit connected in series therewith, preferably also a limiter circuit, limiting the control signal, and providing an output signal which controls, at least in part, the control multivibrator of a fuel injection system. Such fuel injection systems are known (see, for example, U.S. Pat. No. 3,483,851, Reichardt). If the invention is used in connection with a carburetor-type fuel supply, then the output from the low pass filter is preferably applied to a differential amplifier, the differential amplifier controlling an additional or secondary throttle supplying additional air to the internal combustion engine. Additional amplifier circuits may be connected as needed.

It is as possible to control the additional air volume in an injection type fuel supply as in a carburetor type fuel supply with the fuel supply to the latter system being controllable as well by the aid of a fuel metering device.

The invention will be described by way of example with reference to the accompanying drawings, wherein.

Figure 10:
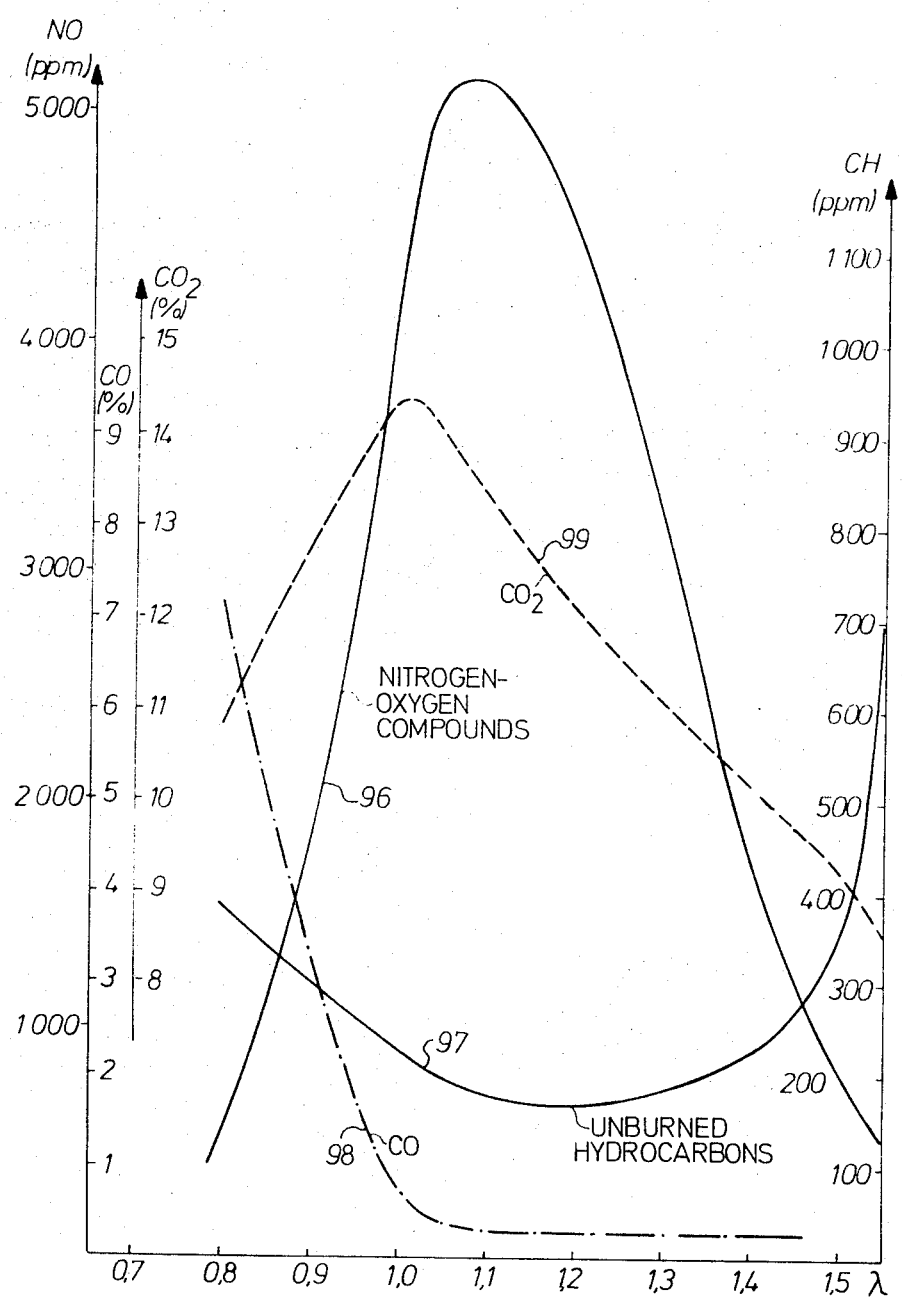
FIG. 10 are graphs to illustrate the operation of all the embodiments.

Referring first to FIG. 10, which illustrates the composition of motor exhaust in dependence on the air-fuel mixture $\lambda$. Solid curve 96 represents nitrogen-oxygen compounds; solid curve 97 represents unburnt hydrocarbons; chain-dotted curve 98 represents carbon monoxide (CO) and dashed curve 99 represents carbon dioxide ($CO_2$). The CO and the $CO_2$ contents are given in percentages, the unburnt hydrocarbon and nitrogen compounds are given in parts per million (ppm).

As clearly seen in FIG. 10, there is no single $\lambda$ in which all three noxious components of the exhaust, that is, nitrogen compounds, unburnt hydrocarbons, and CO simultaneously have a minimum value. In accordance with the present invention, it is possible to use either a simple thermal reactor as an afterburner; it is also possible, however, to use a catalytic reactor to bind the N-O compounds. In this case, only a so-called single bed catalyst reactor is necessary. A single bed catalyst reactor only has a single catalytically active substance to reduce the nitrogen-oxygen compounds. In known devices which use exhaust reactors, more than one catalyst bed is necessary in the reactors.

Figure 1:
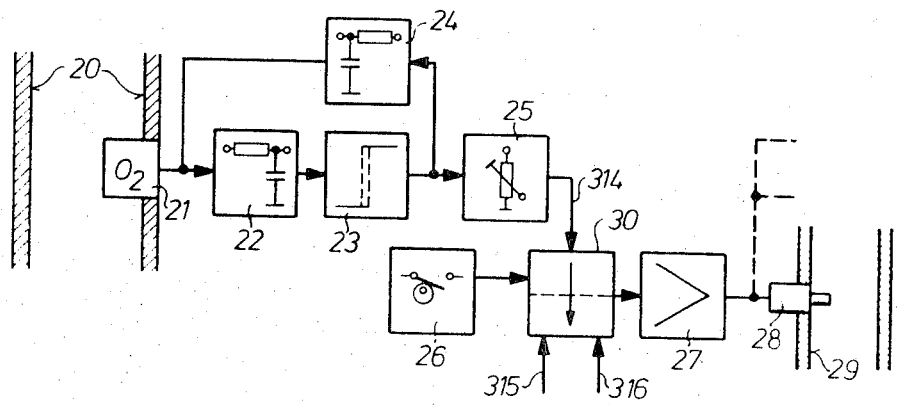
FIG. 1 is a schematic block circuit diagram of a first embodiment of the invention.

Referring now to the embodiments of the invention and first to FIG. 1: The exhaust pipe 20 has a sensing element 21 inserted therein. Sensing element 21 senses partial oxygen pressure, and provides an output signal to a series circuit formed of a low pass filter 22, a threshold switch or threshold circuit 23 and a limiter circuit 25. A feedback circuit including a low pass filter 24 is connected between the output of the threshold circuit 23 and the input to the low pass filter 22. A fuel injection system having a fuel injection valve 28 injecting fuel into the manifold 29 is supplied with fuel from a source (not shown). The fuel injection valve is opened electrically, supplied from an electric power amplifier 27 which, in turn, is controlled by a control multivibrator circuit 30. Multivibrator circuit 30 has a control input, and three additional timing or command inputs 314, 315, 316. The control input is controlled by a switch 26, timed with the rotation of the internal combustion engine. Command input 314 is connected to the output of the limiter circuit 25.

Figure 2:
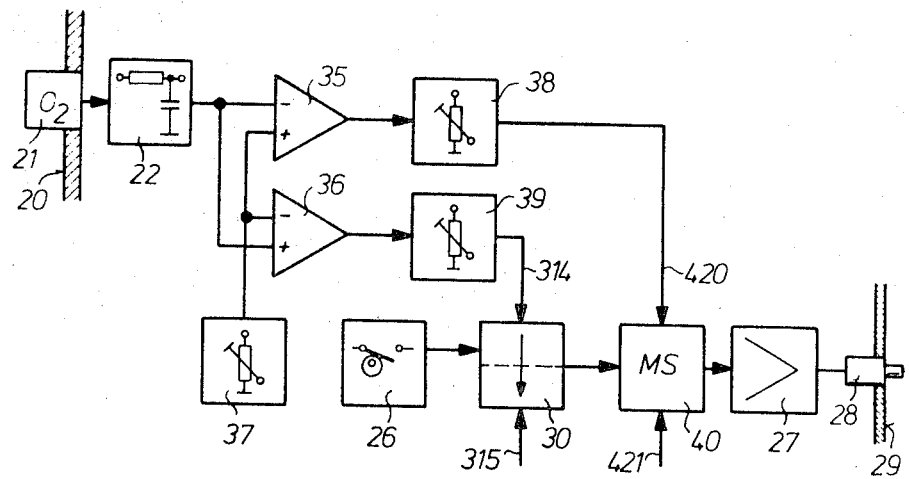
FIG. 2 is a schematic block circuit diagram of a second embodiment.

Embodiment of FIG. 2: A pair of differential amplifiers 35, 36 are connected to the output of the low pass filter 22. Each one of the differential amplifiers 35, 36 has a control signal limiter circuit 38, 39 connected in series therewith. A reference source 37 is connected to the other inputs of each of the control amplifiers 35, 36, the reference source preferably being formed as a voltage divider and providing a fixed reference potential. Contrary to the embodiment of FIG. 1, a multiplier stage 40 is provided between the control multivibrator 30 and the power amplifier 27. The multiplier stage 40 has two control inputs 420, 421. Limiter 38 is connected to control input 420 of the multiplier circuit and limiter 39 is connected to the control input 314 of the multivibrator 30.

Figure 3:
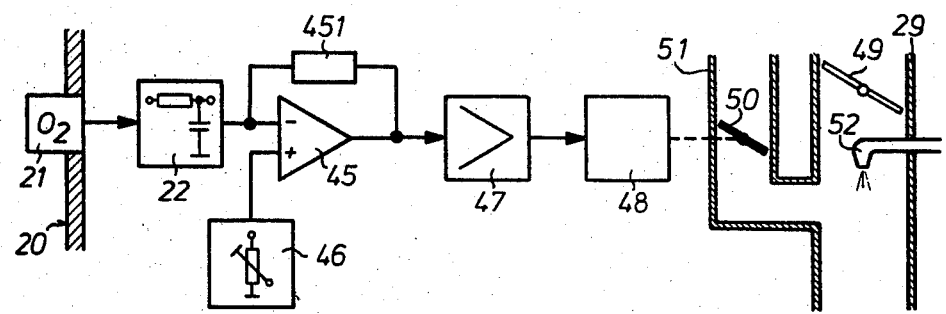
FIG. 3 is a schematic block diagram of a third embodiment, for use with a carburetor-type fuel supply.

Embodiment of FIG. 3: The preceding embodiments of FIGS. 1 and 2 are directed to control the amount of fuel being injected by a fuel injection system. The embodiment of FIG. 3 is used in combination with a carburetor-type fuel supply for an internal combustion engine. The carburetor is indicated only symbolically as a fuel injection nozzle 52 placed in the intake manifold line, just beyond the throttle 49. Behind the carburetor inlet (with respect to the direction of air flow) an additional air inlet tube is provided, having an additional throttle 50 located therein. The position of the additional throttle 50 is controlled by a power amplifier 47 which determines the position of an electric current-position transducer 48, connected to throttle 50. A control amplifier 45 is located between the low pass filter 22 and power amplifier 47; control amplifier 45 has a feedback circuit 451 connected thereacross and, in turn, has a second control input supplied by a reference source 46, so that the control amplifier 45, operating as a differential amplifier, will have the transfer characteristics of a proportional controller. The reference source 46 may be a voltage divider, similar to the element 37 (FIG. 2), to provide a fixed reference voltage.

Figure 4:
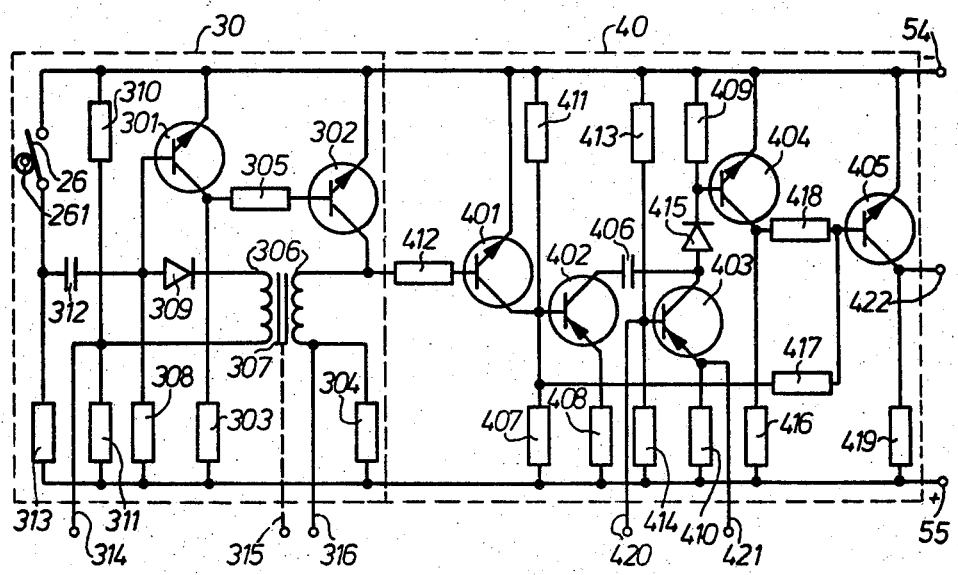
FIG. 4 is a fragmentary circuit diagram of the second embodiment.

FIG. 4 is a detailed circuit diagram of the control multivibrator circuit and multiplication stage 40 of FIG. 2. Control multivibrator 30 has two npn transistors 301, 302, the emitters of which are connected directly to negative bus 54. The collectors of transistors 301, 302 are connected over collector resistances 303, 304 with a positive bus 55. Between the collector of transistor 302, and the collector of resistor 304, the primary winding of a transformer 306 is connected, the secondary winding of which is connected over a diode 309 to the base of the first transistor 301 and further to the tap point of a voltage divider formed of resistances 310, 311. The core 307 of the transformer 306 is movable and can be changed and positioned by means of a mechanical input 315, for example controlled by the vacuum in the intake manifold of the internal combustion engine, as transduced by a bellows, a diaphragm chamber or the like, as set forth in more detail in the aforementioned cross referenced patent. The base of the first transistor 301 is connected over a resistance 308 with positive bus 55; the base of the second transistor 302 is connected over resistance 305 with the collector of the first transistor 301.

The input to the multivibrator 30 includes a differentiating circuit which has a resistance 313 and in a condenser 312. The junction point between resistance 313 and condenser 312 is connected to the movable contact of a switch 26. The fixed contact of switch 26 is connected to the negative bus 54. Cam 261 operates the contact of switch 26. The mechanical input 315 forms one of the control inputs, referred to also in FIG. 2.

The multiplication stage 40 has three npn transistors 401, 404, 405, the emitters of which are connected directly to negative bus 54. Two pnp transistors 402, 403 have their emitters connected over an emitter resistance 408, 410 with positive bus 55. The first transistor 401 serves as an impedance match element. Its base is connected over resistance 412 to the collector of transistor 302 in the control multivibrator 30. The collector of transistor 401 is connected to the tap point of a voltage divider formed of resistances 411, 407 and to the base of transistor 402. The collector of transistor 402 is connected with one electrode of a storage condenser 406, the other electrode of which is connected to the collector of transistor 403 and,further, over a diode 415 to the base of transistor 404. A base voltage supply formed of voltage divider resistances 413, 414 is provided for transistor 403. The base of transistor 404 is connected to negative bus 54 over resistance 409. The collector of the transistor 404 is connected over a resistance 416 to positive bus 55 and over a resistance 418 to the base of transistor 405. The base of transistor 405 is connected further over a resistance 417 to the collector of transistor 401. The collector of transistor 405 is connected over a resistance 419 to positive bus 55.

The controls to the circuit are formed by the base of the transistor 301 — controlled by switch 26. A mechanical control input is provided at 315, by shifting of the core 307. Two additional electrical control inputs 314,316 are provided. Control input 314 is connected to the tap point of the voltage divider 310, 311. The control input 316 is connected to the tap point between the primary winding of transformer 306 and resistance 304. Similarly, the multiplication stage 40 has a pair of control inputs 420, 421 connected respectively with the base and the emitter of transistor 403. The collector of transistor 405 is connected to the output 422 of multiplication stage 40.

Figure 5:
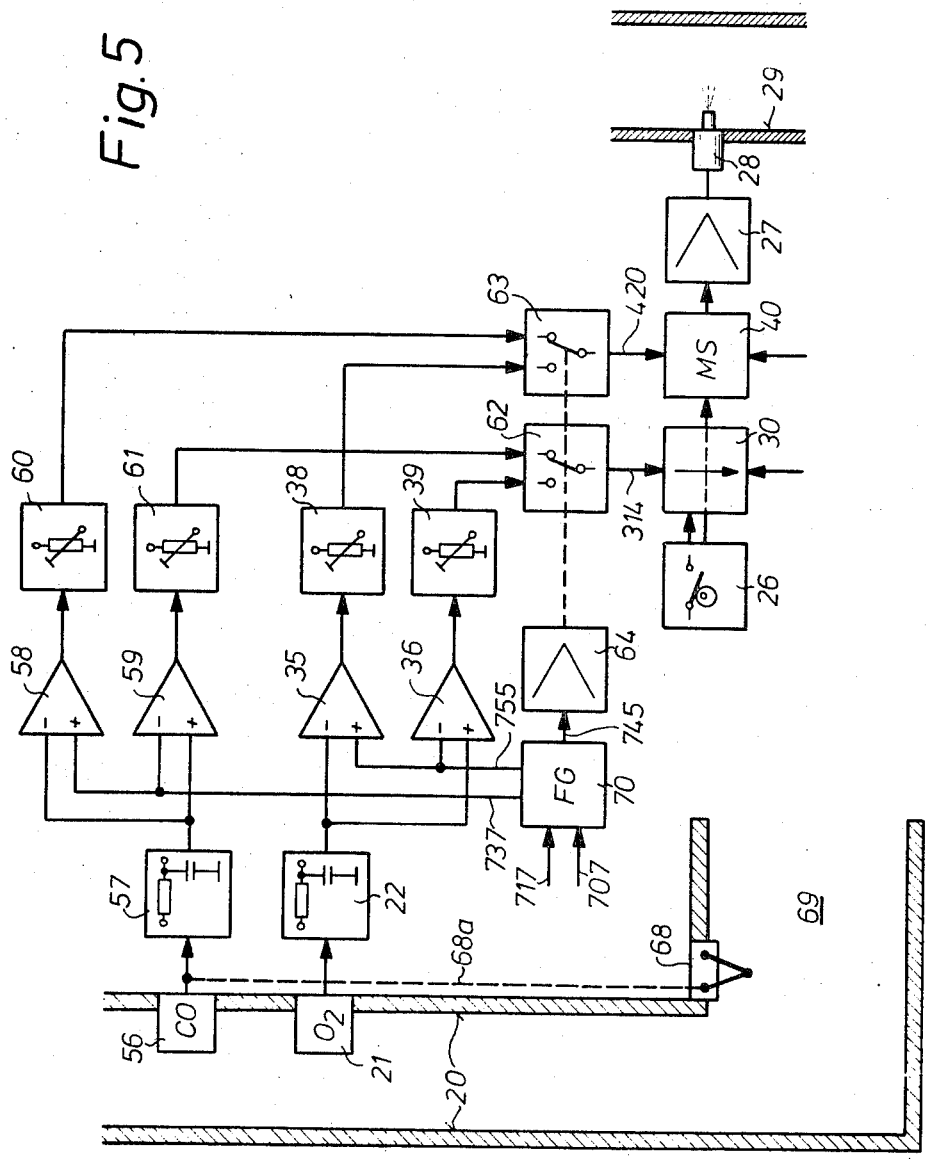
FIG. 5 is a block circuit diagram of a fourth embodiment.

FIG. 5: In part, the same elements as those used in the second example in accordance with FIG. 2 are used, and they have been given the same reference numerals and will not be described again. Additionally, a carbon monoxide (CO) sensing element 56 is located in the exhaust system 20 of the internal combustion engine. It is connected over a second low pass filter 57 to third and fourth differential amplifiers 58, 59. Both differential amplifiers have a control signal limiter circuit 60, 61, respectively connected in series therewith.

A function generator 70 is provided having one output 745 connected to a switching amplifier 64. The switching amplifier 64 operates a pair of transfer switches 62, 63, the first of which is connected with its output to the control input 314 of control multivibrator 40 and the second, 63, being connected to the control input 420 of multiplier stage 40. A second output 755 of the function generator is connected to the second inputs of the first and second differential amplifiers 35, 36. The second inputs of the third and fourth differential amplifiers 58, 59 are connected to the third output 737 of function generator 70. The function generator 70 has two inputs, 707, 717. The two inputs of the first transfer switch 62 have the limiter circuits 39 and 61 connected thereto; the two inputs of the second transfer switch 63 have the second and the fourth limiter circuits 38, 60 connected thereto.

The exhaust pipe 20 as part of the exhaust system of the internal combustion engine terminates in an exhaust gas reactor 69. The temperature of the exhaust gas reactor 69 is sensed by a temperature sensing device 68, such as a thermo couple. The temperature sensor 68 can be utilized instead of the CO sensing element 56 and be connected to the input of the second low pass filter 57, as indicated in dashed lines 68a.

Figure 6:
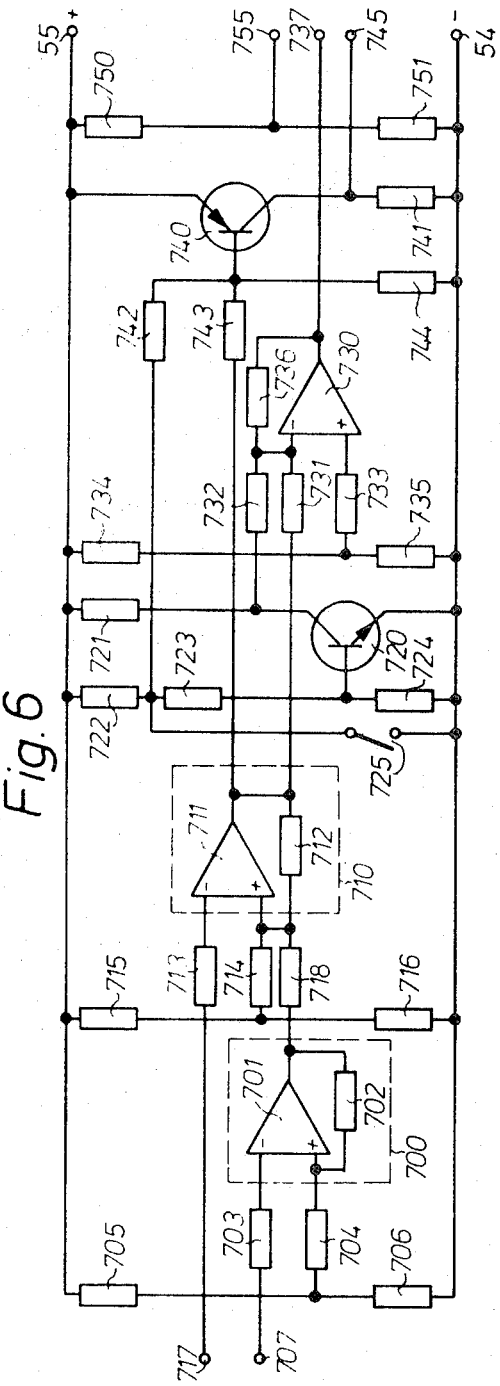
FIG. 6 is a fragmentary circuit diagram illustrating a function generator to be used in the fourth embodiment of FIG. 5.

The function generator 70 is illustrated in detail in FIG. 6. It has, as essential components, a first threshold switch 700, a second threshold switch 710, a first switching transistor 720, an operational amplifier 730 and a second switching transistor 740. The first threshold switch 700 includes an operational amplifier 701 connected in positive feedback by means of a resistance 702. The inverting input of the operational amplifier 701 is connected over a resistance 703 to the first input 707 of the function generator 70. The non-inverting input of the operational amplifier 701 is connected over a resistance 704 to the tap point of a voltage divider formed of a pair of resistances 705, 706.

The second threshold circuit 710 includes an operational amplifier 711 with a positive feedback resistance 712. The inverting input of the operational amplifier 711 is connected over resistance 713 to the second input of the function generator 70. The non-inverting input of operational amplifier 711 is connected over resistance 718 to the output of the first threshold switch circuit 700 and over a resistance 714 to the tap point of a voltage divider formed of resistances 714, 716.

The first switching transistor 720 is an npn transistor, and has its emitter connected to the negative bus 54, and its collector over a resistance 721 to the positive bus 55. Three resistances 722, 723, 724 form the base voltage divider of the first switching transistor 720, the base of which is connected to the junction between resistances 723, 724. The junction between resistances 722 and 723 can be connected over an engine idling switch 725 with negative bus 54.

The operational amplifier 730 has resistance 736 in its feedback circuit, so that it operates as a differential amplifier. Its non-inverting input is connected on the one hand over resistance 731 to the output of the second threshold switch 710 and further over a resistance 732 to the collector of the first switching transistor 720. The non-inverting input of operational amplifier 730 is connected over resistance 733 to the tap point of a voltage divider formed of resistances 734, 735.

Figure 7:
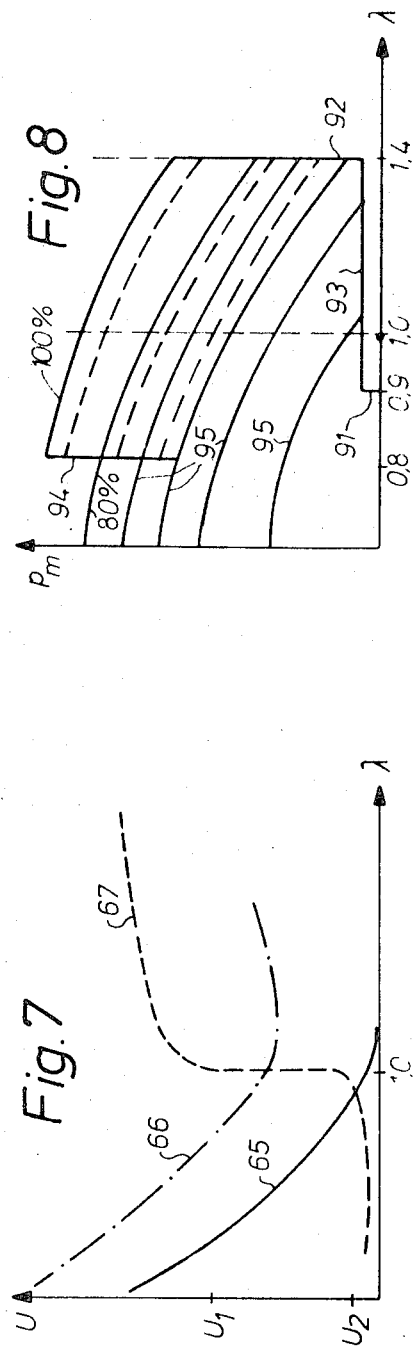

The second switching transistor 740 is an npn transistor and is connected with its collector over a resistance 741, and with its base over a resistance 744 to negative bus 54. The base of the second switching transistor 740 is connected further over resistance 742 to the tap point of voltage divider 722, 723 (combined with 724) and over a resistance 743 to the output of the second threshold switch 710. The collector of the second switching transistor 740 forms the first output 745 of function generator 70; the output of operational amplifier 730 forms the second output 737. The tap point of a voltage divider formed of a pair of resistances 750, 751 forms the third output 755 of function generator 70 (FIG. 5). FIG. 7 illustrates the output signals of the sensing elements in dependence of the air-fuel mixture λ, where λ represents, at value 1 (100 percent) a predetermined ratio, for example the minimum air-fuel mixture resulting in theoretically perfect combustion of hydrocarbons. The ordinate represents voltage. Solid curve 65 represents the output voltage of the CO sensor 56. Chain-dotted line 66 illustrates the output of the temperature sensor 68. Dotted line 67 illustrates the output voltage of the oxygen sensor 21.

Figure 8:
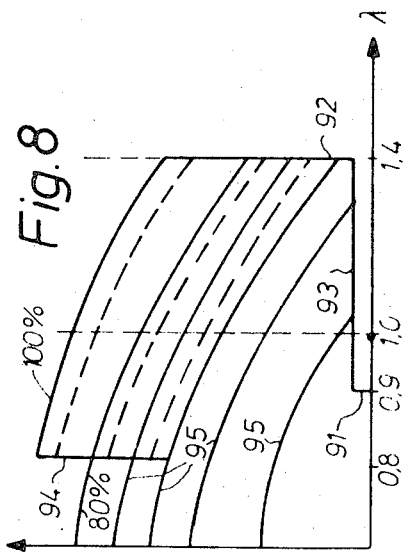
FIGS. 7 and 8 are graphs illustrating the operation of the fourth embodiment of FIG. 5.

FIG. 8 is a graph illustrating operational relationship of an internal combustion engine. The average pressure $p_m$ in the cylinders of a cylinder-type internal combustion engine is represented by the ordinate, the air-fuel mixture λ as the abscissa. The various curves 95 are representative of accelerator control position as percentage of maximum possible excursion. Lines 91, 92 and 94 are lines of equal λ, as controlled by the system of the fourth example (FIG. 5). Line 93 illustrates the change from idling to low load operation.

Figure 9:
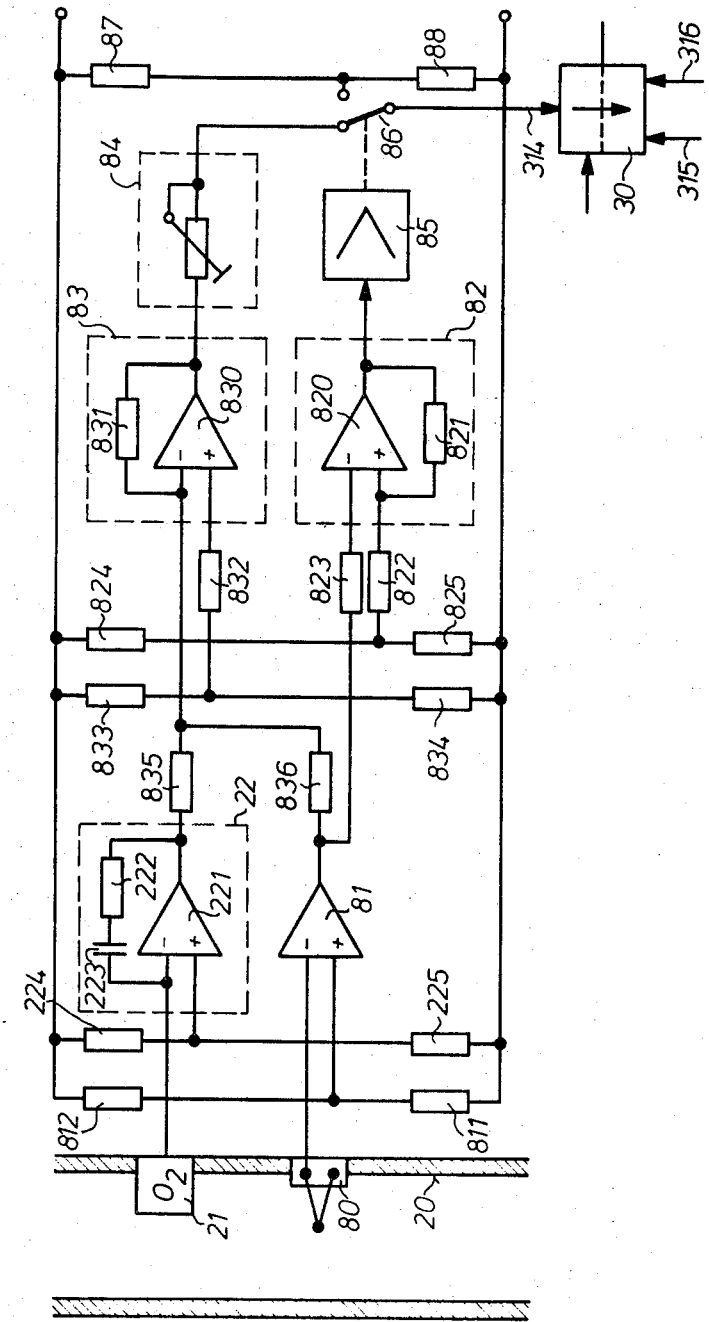
FIG. 9 is a schematic block diagram of a fifth embodiment.

A fifth example is illustrated in FIG. 9, in which the exhaust pipe 20 has a temperature correction thermo element 80 besides the oxygen sensing device 21. Besides low pass filter 22 (described in detail below), a differential amplifier 81 is provided connected to the temperature sensor; a control amplifier 83, a threshold switch 82, a limiter circuit 84, and a switching amplifier 85 are included in the circuit. The low pass filter 22 is formed as an active, that is, dynamic low pass filter having an operational amplifier 221. The non-inverting input of operational amplifier 221 is connected to the tap point of a pair of resistances 224, 225 forming a voltage divider; the non-inverting input is connected to the oxygen sensor 21. The low pass characteristic is obtained by including a series connection of a resistance 222 and a condenser 223 in the feedback circuit of the operational amplifier 221.

The thermo element 80 is connected to the inverting input of differential amplifier 81, the non-inverting input of which is connected to the tap point of a voltage divider formed of resistances 811, 812. The outputs of the two operational amplifiers 221 and 81 are connected, each, over a resistance 835, 836, respectively, to the inverting input of an operational amplifier 830 which forms the dynamic or active element of the control amplifier 83. The operational amplifier 830 has a resistance 831 in its feedback circuit, so that it will have the characteristics of a proportional controller. The non-inverting input of operational amplifier 830 is connected over resistance 832 to the tap point of a voltage divider formed of resistances 833, 834. The limiter circuit 84 may, merely, be a trimmer resitance, connected as shown in FIG. 9.

The threshold switch 82 includes an operational amplifier 820 having a feedback resistance 821. The inverting input of the operational amplifier 820 is connected over resistance 823 to the output of differential amplifier 81; the non-inverting input is connected over a resistance 822 to the tap point of voltage divider 824, 825. A switching amplifier 85 is connected to the output of operational amplifier 820 to operate the transfer switch 86.

The output of the transfer switch 86 is connected to the control input 314 of control multivibrator 30. The first input of the transfer switch 18 is connected to the limiter 84, and the second input of transfer switch 86 to the tap point of a voltage divider 87, 88, forming a fixed reference source, and connected over positive and negative buses 55, 54 (FIGS. 4, 6).

Operation of the control multivibrator 30 and multiplying stage 40: Stages 30 and 40 are known, and will therefore be reviewed only briefly. In the stable state of the monostable multivibrator (MV) 30, transistor 301 is conductive and transistor 302 is blocked. Switch 26 provides negative pulses in synchronism with engine rotation over differentiator 312, 313, to the base of transistor 301 which thereby becomes blocked. The impulse period of the monostable MV 30 is determined by the counter inductivity of transformer 306. This inductivity can be changed by mechanical shifting of iron core 307. The multiplying stage 40 adds a second pulse to the output pulse of control multivibrator 30, the duration of which is controlled by the control inputs 420, 421. Transistor 401 acts as an impedance matching stage which is blocked during the pulse duration of the monostable control multivibrator 30 and is conductive during the pulse interval.

At the termination of the output pulse of control multivibrator 40, the collector voltage of transistor 401 suddenly jumps in negative direction. This voltage jump is transferred from the base of transistor 402 to the collector of transistor 402, and from there over the storage condenser 406 and diode 415 to the base of transistor 404. Transistor 404 will block. The blocking period of transistor 404 is limited by the discharge of storage condenser 406, slowly discharging through transistor 403 which thus acts as a constant current source. This discharge time is determined by the current level of the constant current source, and can therefore be influenced by means of the two control inputs 420, 421 which are connected to the base and to the emitter, respectively, of transistor 403. Transistor 405, with its two base resistances 417, 418 functions as an OR-gate. It is conductive when either of transistors 401 or 404 is blocked. Thus, transistor 405 will become conductive during the pulse duration of control multivibrator 30 and, additionally, during the pulse duration of multiplying stage 40. Output 422 thus can provide an output to the control amplifier 27 to open the fuel injection valve for such a period of time as transistor 405, in the aggregate, is conductive.

The impulse period of the multiplication stage 40 is in multiplicative relationship to the impulse period of the control multivibrator 30, since condenser 406 is charged with a constant current during the pulse period of the control multivibrator 30. The voltage jump on collector 402 is thus proportional to the pulse period of control multivibrator 30.

The circuit of control multivibrator 30 and the multiplicating stage 40 provides various possibilities to control the injection period of the fuel injection valve 28. The impulse period of control multivibrator 30 is controlled in dependence on the pressure (or, rather, vacuum) in the intake manifold over the mechanical control input 315, and further over the two electrical control inputs 314, 316. The electrical control inputs influence the base voltage of transistor 301 and further the emitter bias of transistor 302. The multiplication stage 40 has the already described control inputs 420, 421. Additional control inputs, such as motor temperature, air temperature, ambient air pressure, motor speed, can be feed into the circuit; in accordance with the invention, one of the control parameters is the partial oxygen pressure in the exhaust gas.

Operation of the system: In the example of FIG. 1, a sudden jump from $U_1$ to $U_2$ in the output voltage 67 (see FIG. 7) of the oxygen sensor 21 at the value of λ = 1.0 is utilized in order to control the λ as accurately as possible to a value of 1.0. The block circuit diagram of FIG. 1 only indicates a single control multivibrator 30 without an added multiplication stage 40. The pulse period of the control multivibrator 30 is fixed to a value which provides slightly less injection time, that is, slightly less fuel than that which corresponds to a λ = 1, so that, under ordinary conditions, it will operate under λ = 1.02. This results in an excess amount of oxygen in the exhaust gases; the output signal on the oxygen sensor 21 thus exceeds the threshold value of threshold switch 23. After threshold switch 23 exceeds its threshold voltage, an output signal is provided which, transmitted over limiter 25, is applied to control input 314 of the control multivibrator 30, and which increases its pulse period or pulse duration by a fixed value, continuing to control the increase until a λ of about 0.98 is obtained. This causes a decrease in the partial oxygen pressure in the exhaust system 20, the output signal of the oxygen sensor 21 then decreasing below the threshold value of switch 23 which re-sets, permittingagain a slightly leaner mixture. Any one of the electrical control inputs to control multivibrator 30 can be used, such as control input 316.

FIG. 1, thus operates in an on-off mode. The fuel ratio λ is constantly oscillating between values of 0.98 and 1.02. The feedback circuit 24, which has a low pass characteristic is provided in order to feed back the output signal from threshold circuit 23 back to the input, so that the switching tolerance, that is, the error from commanded value is decreased. The limiter 25 only permits a certain predetermined maximum change of the operating element, in this case the time during which the fuel injection valve can operate, that is, the variation in pulse period or pulse time, and can again be a mere tap resistance, as illustrated in element 84, FIG. 9.

Operation, FIG. 2: This system is particularly useful when a comparatively large number of λ, for example in the order of 1.3 to 1.4 is to be set. Oxygen sensor 21 operates at the right side of the sudden jump of curve 67 (FIG. 7). This branch rises only slightly, so that it is desirable to use not a threshold switch, but rather a pair of differential amplifiers 35, 36 in order to utilize the output signal of the oxygen sensor 21. Both differential amplifiers 35, 36 have a common reference voltage applied thereto from the reference source 37, which corresponds, for example, to a value of λ = 1.35. The first differential amplifier 35 is then set to control λ downwardly, that is, if the λ = 1.35 is exceeded, it will become operative; the second differential amplifier is set to control λ upwardly, that is, when λ is less than 1.35, it will control the value upwardly. If, for example, λ = 1.35 is exceeded, then the output voltage of the first differential amplifier 35 strongly changes in positive direction, and the output pulse of multiplying stage 40 is increased, so that more fuel will be injected. If the correction had been too great, then the λ will decrease below 1.35. The output voltage of the second differential amplifier 36 will then change in positive direction and decrease over the limiter circuit 39 and correction input 314 the pulse duration of control multivibrator 30. The control, in accordance with the second embodiment of FIG. 2, is thus continuous, which permits a great accuracy of control and a low control frequency. It has been found desirable to apply the output signals of the two differential amplifiers 35, 36 to different stages of the fuel injection system, namely to the control multivibrator and to the multiplication stage 40, respectively. Feedback circuits 24 can be connected between the outputs of the differential amplifiers 35, 36 and the input to the low pass filter 22, as shown in FIG. 1.

Operation of system of FIG. 3: The operation of this system is similar to that of FIG. 2, in that the λ is first controlled to be set to a somewhat higher value than that desired; this system is specifically adapted for use with a carburetor supplying the fuel-air mixture to an internal combustion engine. It utilizes analog circuitry.

The control amplifier 45 has the characteristics of a proportional controller and controls with its output directly the physical position of an additional or auxiliary air throttle 50. When the partial pressure of oxygen in the exhaust system 20, for example in the exhaust manifold, the exhaust pipe or in the muffler becomes excessive, then the output signal of control amplifier 45 will change in negative direction so that the auxiliary air throttle is moved into closing direction. The commanded value of λ is set by means of a reference source 46.

In the above three examples of FIGS. 1, 2, 3, the control has been of λ to a uniform value for all operating conditions of the internal combustion engine. The embodiment in accordance with FIG. 5 provides a function generator 70 in order to match the λ to operating parameters of the engine, or ambient parameters in which it operates. Reference will also be made to the circuit of the function generator in FIG. 6 and to the graphs of FIG. 8.

It is difficult to operate an internal combustion engine with a lean mixture when the engine is idling. Additionally, if the mixture is lean (a high value of λ), then the maximum output of the internal combustion engine decreases substantially. The embodiment of FIG. 5 therefore permits to set the λ to a lower value when the engine is idling, to operate the engine at low and intermediate load with a high λ and, to again operate the engine with a lower λ when full load is being approached or reached.

In addition to the oxygen sensor 21, a CO sensor 56 or a temperature sensor 68 is provided. The CO sensor 56 and temperature sensor 68 are quite equivalent, as can be seen by the graphs of FIG. 7 (curve 65, 66) with respect to λ. Both sensors 56, 68 can be used when λ should be less than 1.0, that is, when the oxygen sensor 21 provides outputs which are difficult to evaluate. The two transfer switches 62, 63 (FIG. 5) are provided to selectively connect the differential amplifiers 35, 36 at higher values of λ, and the differential amplifiers 58, 59 at low values of λ. Instead of a transfer switch 62, 63 utilizing relay contacts, transistor circuits or other solid state circuits may be used which suitably short-circuit or by-pass the outputs of the respective differential amplifiers.

Operation of function generator (FIG. 6): The first threshold switch 700 is controlled by a direct voltage $U_v$ over input 707, having a value which is proportional to vehicle speed. At low vehicle speeds, the first threshold switch provides a positive output signal; at higher vehicle speeds, it provides a negative output signal. It thus changes the threshold value of the second threshold switch 710 over resistance 718 in such a direction that the threshold switch 710 cannot switch below a predetermined speed. The second input 717 has a direct voltage $U\alpha$ applied over the second input 717. The voltage $U_\alpha$ is equal to the deflection angle α of the accelerator control for the internal combustion engine. The output voltage of the second threshold switch 710 changes its value thus in dependence on deflection angle of the accelerator only above a predetermined vehicle speed.

The second switching transistor 740 is either conductive or blocked and thus determines into which position the two transfer switches 62, 63 (FIG. 5) are to be set, that is, if the value for λ should be higher or lower. The switching condition of transistor 740 is determined by the output voltage of the second threshold switch 710 and further by the position of the idling switch 725. At large input voltages $U_\alpha$, that is, when the accelerator control is deflected to a great extent, or if the idler switch 725 is closed, the input voltage of the second switching transistor 740 is negative and the transistor 740 thus conductive. In this condition, the two transfer switches 62, 63 are brought in the condition shown in solid lines in FIG. 5, that is, the $\lambda$ is controlled to be less than 1. Idler switch 725 is only closed when the accelerator pedal is in its quiescent condition.

The value of the command voltage which function generator 70 provides at its first output 737 will depend on the conditions of the engine, that is, whether the engine is idling, or fully loaded. The value of this reference or command voltage is determined by the control amplifier 730. The two input resistances 731 and 732 are differently dimensioned, so that the reference voltage at the first output 737 is different when idling from the voltage when under full load.

In a region of lower or medium loading, that is, when neither the idler switch 725 nor the second threshold switch 710 provide a negative signal to the base of transistor 740, switching transistor 740 will be blocked and the two transfer switches 62, 63 are changed over to the position not shown in FIG. 5, so that a relatively large value of $\lambda$ can be determined.

The operation of the example in accordance with FIG. 5 will now be easily understood in connection with the graphs of FIG. 8. When idling, idler switch 725 is closed. Second transistor 740 will become conductive and the two transfer switches 62, 63 will be in the solid line position shown in FIG. 5. Control amplifier 730 will provide a reference voltage at its output 737 for the two differential amplifiers 58, 59 which correspond to a value of $\lambda$ of about 0.9. As soon as the accelerator is operated, the idler switch 725 will open, causing second switching transistor 740 (FIG. 6) to block. The two transfer switches 62, 63 are changed over and differential amplifiers 35, 36 take over control of the fuel-air mixture. The commanded value of $\lambda$ is determined by control amplifier 730 and will be set to a relatively high value, for example 1.4 since, at a small angle of deflection $\alpha$ of the accelerator pedal and small speed $v$, the output of the second threshold switch 710 is positive.

If, with an accelerator angle $\alpha$ of at least 60 percent of full deflection, a certain speed $v$ of the vehicle (determined by the division ratio of voltage divider 705, 706) is exceeded, then the output voltage of the second threshold switch 710 jumps to a negative value, and the second switching transistor 740 will become conductive. The two transfer switches 62, 63 will change over again to the position shown in FIG. 5 and the $\lambda$ is controlled in dependence on CO content of the exhaust gases to a lower value of about 0.8. Transfer from high $\lambda$ to low value follows in accordance with one of the dashed curves of FIG. 8. An unambiguous connection between the accelerator angle $\alpha$ and the transfer of the second threshold switch 710 is not shown in the graph since the relationship of the deflection angle $\alpha$ of the accelerator pedal and the limiting speed as determined by the voltage division ratio of voltage divider 705, 706 will depend not only on this accelerator position, but also on the loading of the vehicle, and condition as well as inclination of the terrain, or roadway over which it operates.

Operation of system in accordance with FIG. 9: This is, in principle, a simplified variation of the second embodiment illustrated in connection with FIG. 2. As in FIG. 2, a high value of $\lambda$, for example 1.4, is controlled in dependence on partial oxygen pressure in the exhaust gas. An active low pass filter 22 is provided which has a capacitive feedback connected to an operational amplifier 221. The output of low pass filter 22 is connected to a simple control amplifier 83 and not, as in FIG. 2, to a pair of differential amplifiers. Control amplifier 83 changes the pulse duration of control multivibrator 30 in continuous mode, for so long as transfer switch 86 is in the position shown. The control, therefore, is not on-off, but rather continuous.

This embodiment, in contrast to that of FIG. 2, provides the possibility to compensate for the temperature variation of response of the partial oxygen pressure sensor 21. A voltage which is proportional to the exhaust gas temperature is applied over resistance 836 to the input of control amplifier 83. This voltage is so applied that transfer switch 86 can disconnect the entire controller for the period that the internal combustion engine is still cold. In this case, the control multivibrator 30 will have a constant voltage determined by the voltage divider 87, 88 applied to the command input 314.

Some oxygen partial pressure sensors 21 require an operating temperature of about 700° C and thus the entire control arrangement can be disconnected when the internal combustion engine is still cold. The system of the present invention is based on the assumption that the output voltage supplied by the sensor varies as shown in the curve 67 (FIG. 7), which is not the case when the sensor is cold. The disconnecting circuit with the threshold switch 82, the amplifier 85 and transfer switch 86 can be eliminated, however, if an additional (not shown) electrical heating device is provided for the oxygen sensor 21 so that, even if the engine is cold, the oxygen sensor itself will reliably reach its operating temperature.

The present invention provides an exact control of the air-fuel mixture, as well as control of the relative proportion, that is, enriched or lean fuel-air mixtures. Various circuits of the various examples can be combined; as an example, the low-temperature cut-off (FIG. 9) can be utilized in all the examples; likewise, the feedback circuit 24 (FIG. 1) can be used in all the examples in order to limit the extent of control deviation and control frequency.

Known measuring and sensing techniques to utilize CO and oxygen partial pressure can be utilized in the system of the present invention. The CO sensor 56 also measures the heat distribution and temperature of the exhaust gases, and the oxygen partial pressure sensor 21 provides an output signal which is sensed in a galvanic chain, which includes an oxygen ion conductive solid electrolyte.

The present invention has been described specifically in connection with a piston-type internal combustion engine, but is equally applicable to other combustion engines in which combustion of fuel results in exhaust gases having various components, the amounts of which depend on different functions of fuel-air mixture. Control for one component over the operating range of the engine and removal of the other components permits simplified control and removal of noxious exhaust, without impairing the operating efficiency or power output of the engine. Thus, single-bed catalytic reactors can be used to eliminate the high amount of nitrogen-oxygen compounds if the engine is operated usually with a somewhat leaner mixture (see solid line graph 96 of FIG. 10) which, at the same time, gives a minimum amount of carbon monoxide and unburnt hydrocarbon exhaust; operating with a slightly richer mixture and providing an afterburner again provides a minimum of noxious exhaust since, (see FIG. 10), the nitrogen-oxygen compounds decrease rapidly at values of λ less than 1.0. The type of exhaust gas reactor wil thus depend on economics and design considerations, the catalytic reactor having the advantage that, as a whole, the exhaust gases are less noxious than when a thermal reactor is used, although first cost and maintenance of the catalytic reactor is somewhat higher than that of an after burner. The present invention, however, permits operating of the engine in such a manner that only a single noxious component need be removed in an the exhaust gases in auxiliary apparatus, the engine itself being operated for lowest noxious emission of the other components, while permitting efficient use of the fuel, operation of the engine, and maximum power output.

We claim:

1. Apparatus to control the ratio of air to fuel of the air-fuel mixture being applied to an internal combustion engine comprising
    oxygen analyzer means (21) responsive to oxygen partial pressure in the exhaust gas and having an oxygen ion conductive solid electrolyte, said analyzer means being located on contact with the exhaust gases from said engine and providing an electrical output signal;
    an electrical control circuit controlling the amount of at least one of the fuel and the air of the air-fuel mixture being applied to the engine;
    a low pass filter (22) interconnected in circuit between the output of the oxygen partial pressure analyzing means and the electronic control circuit;
    a threshold circuit (23) connected in series between the low pass filter and the control circuit, the threshold response of the threshold circuit (23) being set to respond to the voltage jumps (FIG. 7: $U_1$, $U_2$) of the oxygen analyzer means.

2. Apparatus according to claim 1, wherein the control circuit includes a control multivibrator (MV) (30);
    a fuel injection system (27, 28) is provided injecting fuel under control of the switching rate of the control MV (30),
    the output of the low pass filter (23) being applied to the control MV.

3. Apparatus according to claim 2, further comprising a limiter circuit (25) limiting the output of the threshold circuit (23), the limited signal being applied to the control circuit.

4. Apparatus according to claim 1, further comprising (FIG. 1) a feedback circuit (24) including a feedback low pass filter interconnecting the output of the threshold circuit (23) and the input to the low pass filter (22).

5. Apparatus according to claim 1, wherein (FIG. 2) the control circuit includes a control multivibrator (30) and a multiplier stage (40) connected thereto, and a fuel injection system is provided injecting fuel under control of pulses derived from the control multivibrator, and as multiplied in the multiplier circuit, the apparatus further comprising
    a pair of differential amplifiers (35, 36) connected to the output of the low pass filter (22);
    one of the differential amplifiers (35) being connected to an input (314) of the control multivibrator (30) and the other differential amplifier (36) being connected to an input of the multiplier stage (40) connected between the output of the control multivibrator and the fuel injection system.

6. Apparatus according to claim 5, wherein the inverting input of the first differential amplifier (35) and the non-inverting input of the second differential amplifier (36) are connected to the output of the low pass filter (22);
    and a reference source (37) is connected to the non-inverting input of the first differential amplifier and to the inverting input of the second differential amplifier (36).

7. Apparatus according to claim 6, wherein the reference source (37) provides an output voltage which is above the upper voltage level ($U_1$) of the oxygen analyzer (21).

8. Apparatus according to claim 1, wherein the internal combustion engine has an auxiliary air supply (51) and means (50) controlling the amount of auxiliary air being supplied to the engine;
    the electronic control circuit controlling the position of the additional air supply means.

9. Apparatus according to claim 8, wherein the electronic control circuit comprises a differential amplifier (45) interconnecting the output of the low pass filter (22) and the additional air supply control means (50).

10. Apparatus according to claim 9, wherein the differential amplifier has one input connected to an adjustable reference source (46).

11. Apparatus according to claim 1, further comprising carbon monoxide (CO) sensing means (56) located to sense the CO content of the exhaust from the internal combustion engine;
    and circuit means connected with said electronic circuit controlling the relationship between air and fuel of the air-fuel mixture being applied to the internal combustion engine.

12. Apparatus according to claim 11, including an additional low pass filter (57) interconnected between the CO sensing means and the electronic control circuit.

13. Apparatus according to claim 1, further comprising temperature sensing means located to sense temperature levels of the exhaust gases and an additional low pass filter (57) interconnected between said temperature sensing means and the electronic control circuit.

14. Apparatus according to claim 5, further comprising
    a CO sensing means (56) and a second low pass filter (57) connected thereto;
    a second pair of differential amplifiers (58, 59) connected to the output of the second low pass filter (57);
    and means (62, 63) selectively interconnecting the first pair (35, 36) or the second pair (58, 59) of differential amplifiers with the electronic control circuit.

15. Apparatus according to claim 14, further comprising a function generator (70) interconnected with and providing a reference voltage to said differential amplifiers.

16. Apparatus according to claim 15, wherein the function generator (70) has a first control input (707) having a signal applied thereto depending on engine speed and a second control input (717) having a signal applied thereto dependent on the position of the fuel control for the engine, the function generator providing an ouput reference potential depending on engine operating characteristics at given speed and fuel controller positions.

17. Apparatus according to claim 16, comprising a first input threshold switch (700) connected to the first control input of the function generator (70);

a second input threshold switch (710) connected to the output of the first input threshold switch (700) and further connected to the second control input (717) to set the threshold level of an input signal which has been applied to said second control input.

18. Apparatus according to claim 16, including an idle switch (725) interconnected with the fuel controller of the engine and controlling the function generator to provide a fixed reference output signal to the second pair of differential amplifiers (58, 59) connected to the CO sensing means (56).

19. Apparatus according to claim 17, comprising an idle switch (725) interconnected with the fuel controller of the engine;

a switching transistor (740), the output of which forms the first output (745) of the function generator, the idle switch (725) and the second threshold switch (710) controlling said switching transistor;

the first output (745) of the function generator (70) controlling the switching state of said selective interconnection means (62, 63).

20. Apparatus according to claim 18, comprising an operational amplifier (730) interconnected with the output of said idle switch (725) and the second threshold switch (710), the output of the operational amplifier forming the second output (737) of the function generator (70), said output being connected to and providing a reference potential to the second pair of differential amplifiers (58, 59).

21. Apparatus according to claim 14, wherein the function generator (70) comprises a voltage source (55, 54; 750, 751) forming a third output (755) of the function generator (70) and being connected to and providing a reference voltage to the first pair of differential amplifiers (38, 39).

22. Apparatus according to claim 1, including a thermo element (80) in heat sensing relation to the exhaust gases from the internal combustion engine; and
means (81, 83) interconnecting the output of the low pass filter (22) and the output of the thermo element (80) and applying said outputs to the input of the electronic control circuit.

23. Apparatus according to claim 22 (FIG. 9) wherein the interconnecting means interconnecting the output of the low pass filter (22) and the output of the thermo element (80) comprises
a differential amplifier (81) connected to the thermo element;
a control amplifier (83) interconnecting the output of the differential amplifier (81) and the low pass filter;
and means including signal limiting means (84) interconnecting the output of the control amplifier and an input (314) of the electronic circuit (30).

24. Apparatus according to claim 23, further comprising means sensing (82) an output limit of the thermo element (80);
a change-over switch (86) controlled by the output sensing means (82);
a source of reference voltage (87, 88);
said change-over switch (86) selectively interconnecting the reference voltage (87, 88) or the output of said control amplifier (83) to the electronic circuit.

25. Apparatus according to claim 1, comprising an exhaust gas reactor (69) located to have the exhaust gases from the internal combustion engine applied thereto, said exhaust gas reactor being of the single catalyst bed type.

26. Method of controlling the air to fuel ratio of the air component and the fuel component of the mixture being applied to an internal combustion engine comprising
analyzing the exhaust gas for oxygen partial pressure and deriving a sensed electrical signal representative of this analysis;
removing higher frequency components in the output variations of the sensed signal by filtering the sensed signal in a low pass filter and deriving a modified sensed signal;
controlling, under command of said modified sensed signal, the admission of at least one of the components of the mixture to control the ratio of said fuel and air components in the fuel-air mixture to provide an excess of air to obtain exhaust gases from the engine having only a single substantial remaining noxious component resulting from said excess of air;
and the method comprises the further step of
passing the exhaust over a reactor responsive to said single noxious component to remove said single substantial remaining noxious component from the exhaust.

27. Method according to claim 26, comprising the step of sensing an operating parameter of the engine;
and modifying the command transfer function of the modified sensed signal with respect to control of the ratio of components of the mixture in dependence on a sensed operating parameter of the engine.

* * * * *